(12) United States Patent
Jones et al.

(10) Patent No.: US 12,324,543 B2
(45) Date of Patent: Jun. 10, 2025

(54) FOOD PROCESSING SYSTEM

(71) Applicant: SHARKNINJA OPERATING LLC, Needham, MA (US)

(72) Inventors: Zintis Jones, London (GB); Matt Roberts, Medfield, MA (US); Fredrick Ko, Hong Kong (CN)

(73) Assignee: SharkNinja Operating LLC, Needham, MA (US)

( * ) Notice: Subject to any disclaimer, the term of this patent is extended or adjusted under 35 U.S.C. 154(b) by 833 days.

(21) Appl. No.: 17/608,214

(22) PCT Filed: Apr. 10, 2020

(86) PCT No.: PCT/US2020/027593
§ 371 (c)(1),
(2) Date: Nov. 2, 2021

(87) PCT Pub. No.: WO2020/210575
PCT Pub. Date: Oct. 15, 2020

(65) Prior Publication Data
US 2022/0211215 A1    Jul. 7, 2022

Related U.S. Application Data

(60) Provisional application No. 62/832,014, filed on Apr. 10, 2019.

(51) Int. Cl.
*A47J 43/00* (2006.01)
*A47J 43/046* (2006.01)
*A47J 43/07* (2006.01)
*A47J 43/08* (2006.01)

(52) U.S. Cl.
CPC .......... *A47J 43/085* (2013.01); *A47J 43/046* (2013.01); *A47J 43/0722* (2013.01)

(58) Field of Classification Search
CPC ..... A47J 43/085; A47J 43/046; A47J 43/0722
See application file for complete search history.

(56) References Cited

U.S. PATENT DOCUMENTS

| D187,684 S | 4/1960 | Hauser |
| D200,494 S | 3/1965 | Bezark, Jr. |
| D232,297 S | 8/1974 | Mantelet |

(Continued)

FOREIGN PATENT DOCUMENTS

| CN | 104013315 | 9/2014 |
| CN | 108400689 | 8/2018 |

(Continued)

OTHER PUBLICATIONS

Japanese Office Action issued Jul. 19, 2022, for related JP Application No. 2021-538745.

(Continued)

*Primary Examiner* — Anshu Bhatia
(74) *Attorney, Agent, or Firm* — The Webb Law Firm

(57) ABSTRACT

A food processing base of a food processing system includes a housing having a mounting area for receiving an attachment including a processing assembly and a motorized unit arranged within said housing. The motorized unit is operable to rotate said food processing assembly about an axis of rotation. The motorized unit includes a diameter to height ratio that is greater than 3:1.

16 Claims, 14 Drawing Sheets

(56) References Cited

U.S. PATENT DOCUMENTS

| | | |
|---|---|---|
| D336,590 S | 6/1993 | Barnard |
| 6,246,133 B1 | 6/2001 | Embree et al. |
| 6,431,744 B1 | 8/2002 | Ash et al. |
| D525,080 S | 7/2006 | Katz |
| D621,656 S | 8/2010 | Ulanski et al. |
| D625,141 S | 10/2010 | Moore |
| D638,256 S | 5/2011 | Wu |
| D642,858 S | 8/2011 | Lazzer |
| D647,367 S | 10/2011 | Audette et al. |
| 8,132,752 B1 | 3/2012 | Hotaling et al. |
| D678,726 S | 3/2013 | Palermo |
| D690,152 S | 9/2013 | Palermo |
| D705,606 S | 5/2014 | Coakley et al. |
| D711,682 S | 8/2014 | Norland |
| D730,683 S | 6/2015 | Tu |
| 9,049,967 B1 | 6/2015 | Golino et al. |
| 9,149,156 B2 | 10/2015 | Rosenzweig et al. |
| D747,135 S | 1/2016 | Ha |
| D769,061 S | 10/2016 | Diderotto |
| D783,340 S | 4/2017 | Palermo |
| D784,761 S | 4/2017 | Tu |
| D794,381 S | 8/2017 | McConnell |
| 9,848,738 B2 | 12/2017 | Audette et al. |
| D807,700 S | 1/2018 | Tu |
| D808,719 S | 1/2018 | Coakley |
| D811,167 S | 2/2018 | Smith |
| D815,887 S | 4/2018 | Huang |
| D833,814 S | 11/2018 | Smith |
| D839,670 S | 2/2019 | Youngmann |
| D844,372 S | 4/2019 | DeLeo |
| D844,373 S | 4/2019 | DeLeo |
| D844,374 S | 4/2019 | McConnell |
| D846,338 S | 4/2019 | Smith et al. |
| D846,339 S | 4/2019 | Smith |
| D852,574 S | 7/2019 | McConnell |
| D857,441 S | 8/2019 | Ou |
| 10,455,985 B2 | 10/2019 | Lee |
| D874,869 S | 2/2020 | McConnell |
| D880,239 S | 4/2020 | McConnell et al. |
| D881,637 S | 4/2020 | Ye |
| D886,513 S | 6/2020 | Steiner |
| D905,493 S | 12/2020 | Ye |
| D905,504 S | 12/2020 | Upston |
| 10,905,287 B2 | 2/2021 | Tu et al. |
| D920,045 S | 5/2021 | McConnell |
| D925,270 S | 7/2021 | Bannister |
| D925,271 S | 7/2021 | Palladino |
| D925,284 S | 7/2021 | Bannister |
| D932,835 S | 10/2021 | Tu |
| D937,624 S | 12/2021 | Tu |
| D938,220 S | 12/2021 | Tu |
| 11,744,406 B2 | 9/2023 | Golino et al. |
| 2004/0046075 A1 | 3/2004 | Gursel |
| 2007/0133347 A1* | 6/2007 | Mok ............... A47J 43/046 366/205 |
| 2011/0283896 A1 | 11/2011 | Lam et al. |
| 2013/0033959 A1 | 2/2013 | Conti |
| 2013/0077433 A1 | 3/2013 | Conti |
| 2015/0041577 A1 | 2/2015 | Paget |
| 2015/0258514 A1 | 9/2015 | Boozer et al. |
| 2016/0013700 A1 | 1/2016 | Carroll et al. |
| 2016/0037970 A1 | 2/2016 | Golino et al. |
| 2017/0273510 A1 | 9/2017 | Sapire |
| 2017/0341253 A1 | 11/2017 | Arriens et al. |
| 2018/0162607 A1 | 6/2018 | Rivera |

FOREIGN PATENT DOCUMENTS

| | | |
|---|---|---|
| DE | 4447549 A1 | 3/1996 |
| EP | 0491424 A1 | 6/1992 |
| EP | 3424380 | 1/2019 |
| JP | H10108426 A | 4/1998 |
| JP | 2018516679 A | 6/2018 |
| JP | 2018524105 A | 8/2018 |
| KR | 102043839 | 11/2019 |
| WO | 2009049355 A1 | 4/2009 |
| WO | 2019237880 | 12/2019 |

OTHER PUBLICATIONS

First Office Action in Chinese Application No. 202080008676.9, dated Jun. 7, 2023 (with English translation), 20 pages.
Second Office Action in Chinese Application No. 202080008676.9 dated Nov. 9, 2023, with English summary, 15 pages.
International Search Report and Written Opinion in Application No. PCT/US2020/027593 dated Jul. 27, 2020, 11 pages.
International Preliminary Report on Patentability in Application No. PCT/US2020/027593 dated Oct. 21, 2021, 10 pages.
Extended European Search Report for related EP Application No. 20787572.5 dated Jul. 15, 2022.

* cited by examiner

FOOD PROCESSING SYSTEM

BACKGROUND

This application is directed to a food processor, and more particularly, to an individual serving blending system.

Food processors, such as blenders are commonly used to process a plurality of different food products, including liquids, solids, semi-solids, gels and the like. It is well known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Food processors encompass both handheld and freestanding devices. Large freestanding devices occupy a great deal of counter space, making them difficult to store. Such devices are also generally designed for use with large portions. Handheld blenders are more suited to individualized portions but may lack the power needed to fully blend food products. Small freestanding blending devices that provide the power of large freestanding devices and that are well suited to individualized portions require a base that accommodates a motor of sufficient power to provide the blending performance needed. The inclusion of such a motor results in individualized blenders that are either of a height that makes them difficult to store under kitchen cabinets or have a footprint that occupies too much counter space. Accordingly, there remains a need for an individualized blender system that has a small footprint and low profile that still provides sufficient power to fully blend food products.

Further, it has been determined that a food processing operation resulting in a smaller particle size is typically more pleasing to a user. Smaller particle size can be achieved by adjusting several features of the food processor including by increasing the rotational speed of the processing tool. It is therefore desirable to achieve an increased rotational speed of the processing tool under load, such as without changing the configuration of the processing jar or the processing tool.

SUMMARY

According to an embodiment, a food processing base of a food processing system includes a housing having a mounting area for receiving an attachment including a processing assembly and a motorized unit arranged within said housing. The motorized unit is operable to rotate said food processing assembly about an axis of rotation. The motorized unit includes a diameter to height ratio that is greater than 3:1.

In addition to one or more of the features described above, or as an alternative, in further embodiments said diameter to said height ratio is equal to or greater than 10:1.

In addition to one or more of the features described above, or as an alternative, in further embodiments said motorized unit includes a stator assembly having at least one stator lamination, where said diameter to said height ratio is a ratio of said diameter of said at least one stator lamination to said height of said at least one stator lamination.

In addition to one or more of the features described above, or as an alternative, in further embodiments said at least one stator lamination including a plurality of stator arms, and said stator assembly includes a plurality of stator poles, each of said plurality of stator poles including a stator coil wound about at least one of said plurality of stator arms.

In addition to one or more of the features described above, or as an alternative, in further embodiments comprising a drive coupler operable to engage said food processing assembly when said attachment is connected to said housing.

In addition to one or more of the features described above, or as an alternative, in further embodiments comprising a transmission operably coupled to a drive shaft of said motorized unit and said drive coupler, wherein a gear reduction ratio of said transmission is greater than 3:1.

In addition to one or more of the features described above, or as an alternative, in further embodiments a gear reduction ratio of said transmission is up to 20:1.

In addition to one or more of the features described above, or as an alternative, in further embodiments said height of said food processing base is less than 5 inches.

In addition to one or more of the features described above, or as an alternative, in further embodiments said motorized unit is rotatable at a speed between 5000 rpm and about 25000 rpm when no load is applied to said motorized unit.

In addition to one or more of the features described above, or as an alternative, in further embodiments said motorized unit is rotatable at a speed between 5000 rpm and about 13000 rpm when a load is applied to said motorized unit.

According to another embodiment, a food processing base of a food processing system includes a housing having a mounting area for receiving an attachment including a food processing assembly and a motorized unit arranged within said housing. The motorized unit is operable to rotate said food processing assembly about an axis of rotation. The motorized unit includes a plurality of poles, said plurality of poles including more than two poles.

In addition to one or more of the features described above, or as an alternative, in further embodiments said motorized unit has four stator poles.

In addition to one or more of the features described above, or as an alternative, in further embodiments said motorized unit further comprises a stator assembly including a plurality of independent stator coils associated with said plurality of poles, said stator assembly further comprising at least one stator lamination having a plurality of stator arms, wherein each of said plurality of stator coils being wound about at least one of said plurality of stator arms.

In addition to one or more of the features described above, or as an alternative, in further embodiments comprising a drive coupler operable to engage said food processing assembly when said attachment is connected to said housing.

In addition to one or more of the features described above, or as an alternative, in further embodiments comprising a transmission operably coupled to a drive shaft of said motorized unit and to said drive coupler, and a gear reduction ratio of said transmission is greater than 3:1.

According to yet another embodiment, a food processing base of a food processing system includes a housing having a mounting area for receiving an attachment including a food processing assembly and a motorized unit arranged within said housing. The motorized unit is operable to rotate said food processing assembly about an axis of rotation. The motorized unit includes a rotor assembly including a drive shaft rotatable about an axis, an armature affixed to said drive shaft, and a bearing coupled to said drive shaft. The bearing is mounted in overlapping arrangement with said armature relative to said drive shaft.

In addition to one or more of the features described above, or as an alternative, in further embodiments said bearing is mounted concentrically with said armature relative to said drive shaft.

In addition to one or more of the features described above, or as an alternative, in further embodiments said armature includes a hollowed region and said bearing is arranged within said hollowed region.

In addition to one or more of the features described above, or as an alternative, in further embodiments said motorized unit further comprises a stator assembly including at least one stator lamination, and a ratio of a diameter of said at least one stator lamination to a height of said at least one stator lamination is greater than 3:1.

In addition to one or more of the features described above, or as an alternative, in further embodiments said motorized unit further comprises a stator assembly including a plurality of stator poles, said plurality of stator poles including more than two stator poles.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
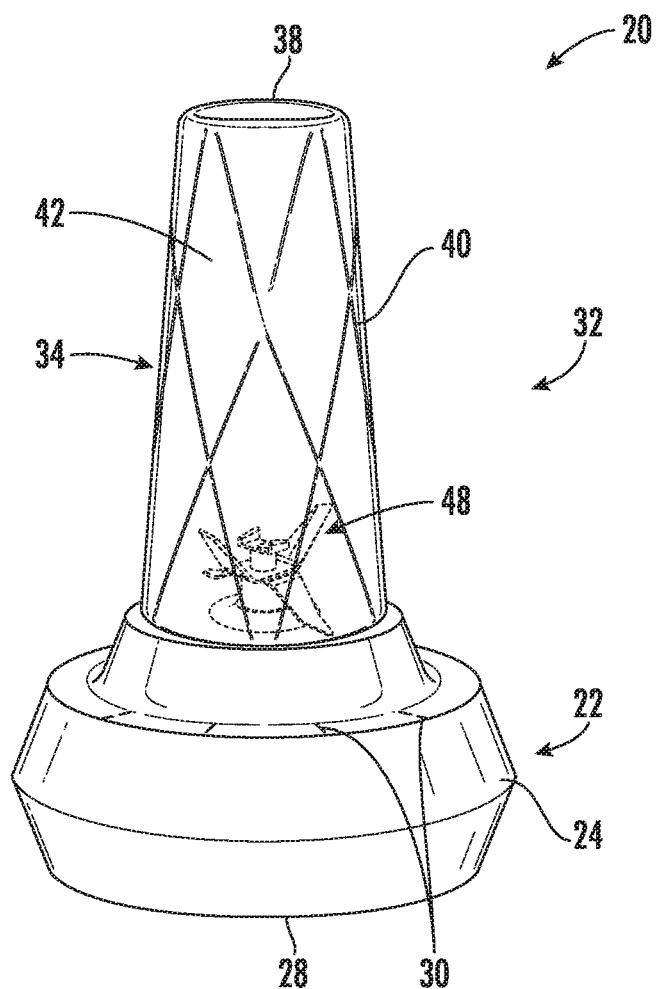
FIG. 1 is perspective view of a food processing system according to an embodiment.
Figure 2:
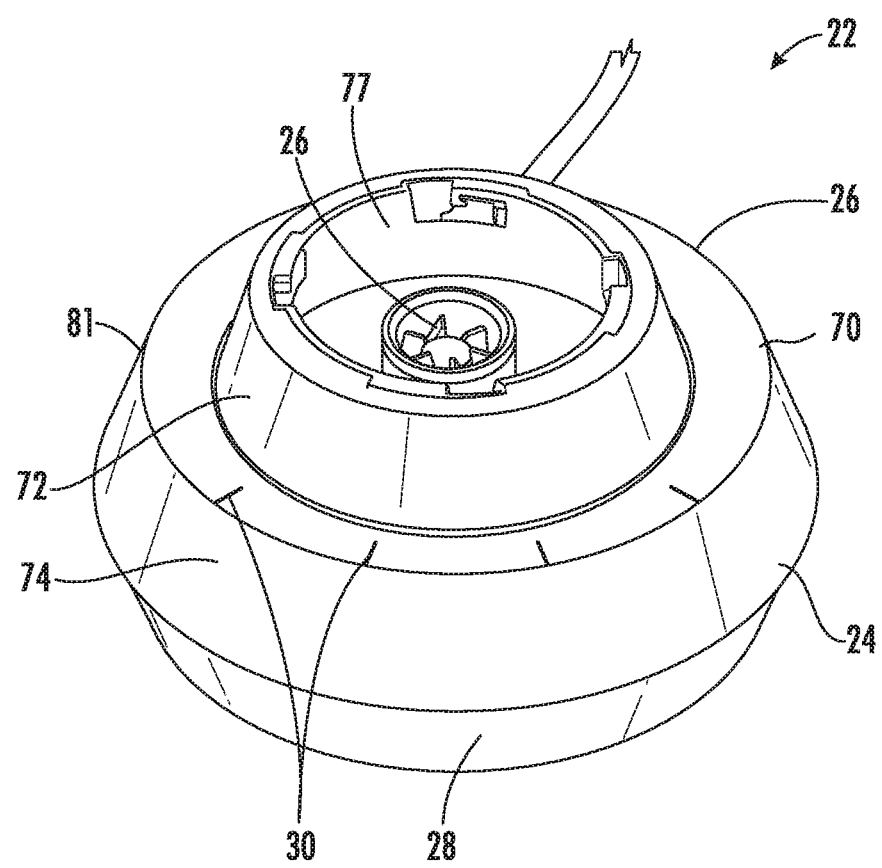
FIG. 2 is a perspective view of a base of the food processing system of FIG. 1 according to an embodiment.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like. Although the food processing system illustrated and described herein is a personal blender system, other food processing systems are within the scope of the present disclosure.

Figure 7:
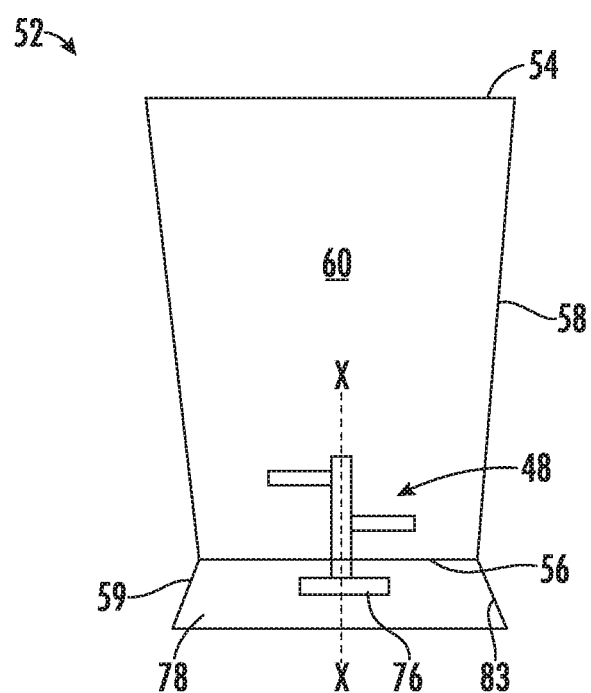
FIG. 7 is a cross-sectional view of the attachment of FIG. 5 according to an embodiment.

The food processing system 20 includes a food processing base 22 having a body or housing 24 within which a drive unit 102 and at least one controller 104 (see FIGS. 7 and 8) are located. The drive unit 102 includes at least one rotary component, such as a drive coupler 26 (see FIG. 2) for example, driven by a motorized unit 106 (see FIGS. 7 and 8) located within the housing 24. The base 22 additionally includes a control panel or user interface 28 having one or more inputs 30 for turning the motorized unit 106 on and off and for selecting various modes of operation, such as pulsing, blending, or continuous food processing. The at least one drive coupler 26 is configured to engage a portion of an attachment coupled to the base 22 for the processing of food products located within an interior of the attachment. This will become more apparent in subsequent FIGS. and discussion.

Figure 3:
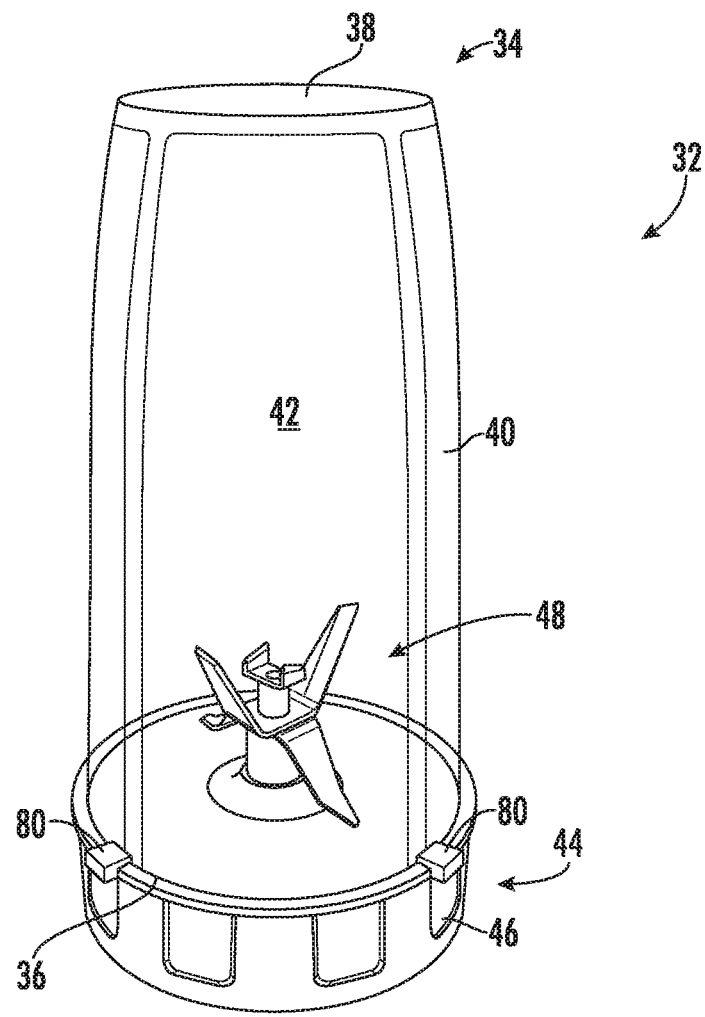
FIG. 3 is a perspective view of an attachment compatible with the base of the food processing system according to an embodiment.

One or more attachments varying in size and/or functionality may be configured for use with the base 22. An example of a first attachment 32 suitable for use with the base 22 is illustrated in FIGS. 1 and 3. As shown, the first attachment 32 includes an inverted jar or container 34. The container 34 typically includes a first open end 36, a second closed end 38, and one or more sidewalls 40 extending between the first end 36 and the second end 38. The sidewalls 40 in combination with one or more of the ends 36, 38 of the container 34 define a hollow interior or processing chamber 42 of the container 34. In an embodiment, the container 34 is a "personal blending container" or "cup" that has a first configuration when separated from the base 22 and a second inverted configuration when coupled to the base 22. In such embodiments, the attachment 32 further includes a processing accessory 44 configured to removably couple to the first open end 36 of the container 34 to seal the processing chamber 42. In the illustrated, non-limiting embodiment, the processing accessory 44 includes a body 46 having a rotatable processing assembly 48 extending therefrom. When the processing accessory 44 is connected to the container 34, the rotatable processing assembly 48 is disposed within the processing chamber 42 of the container 34. The container 34 and the processing accessory 44 may be threadably coupled together; however, it should be understood that other mechanisms for removably connecting the container 34 and the processing accessory 44, such as a bayonet connection or a clip for example, are also contemplated herein.

Figure 4:
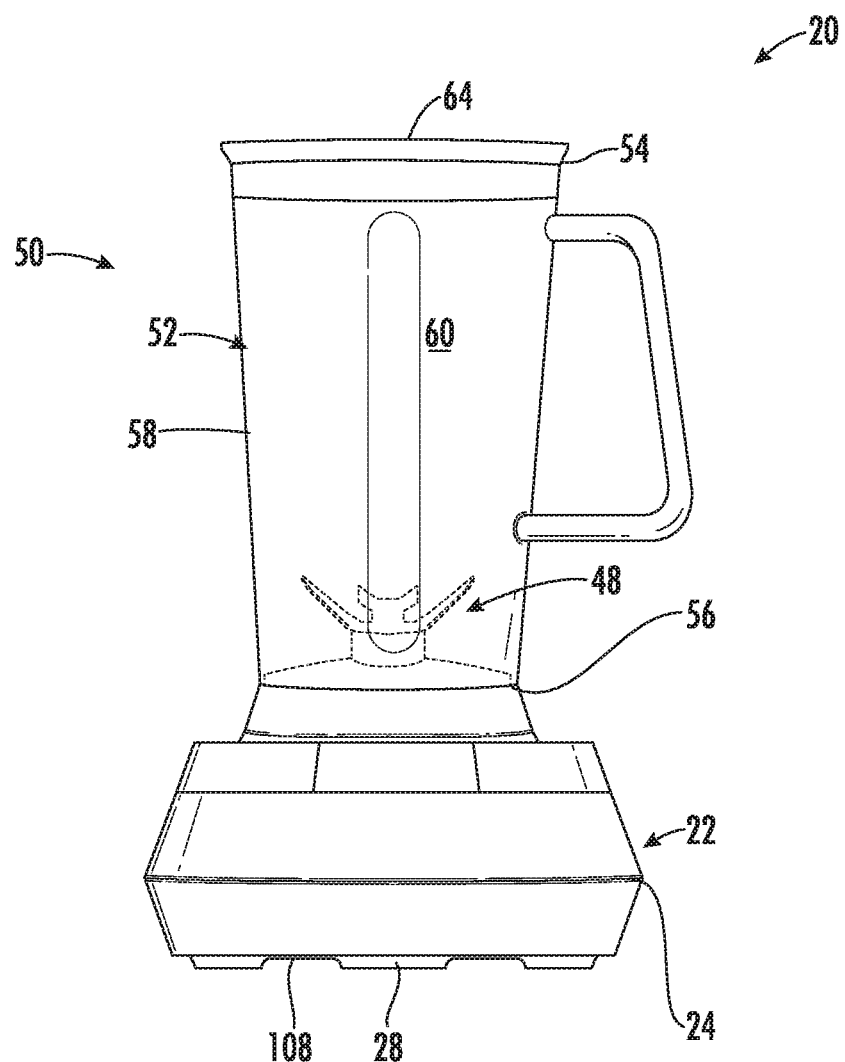
FIG. 4 is a perspective view of a food processing system including another attachment according to an embodiment.
Figure 5:
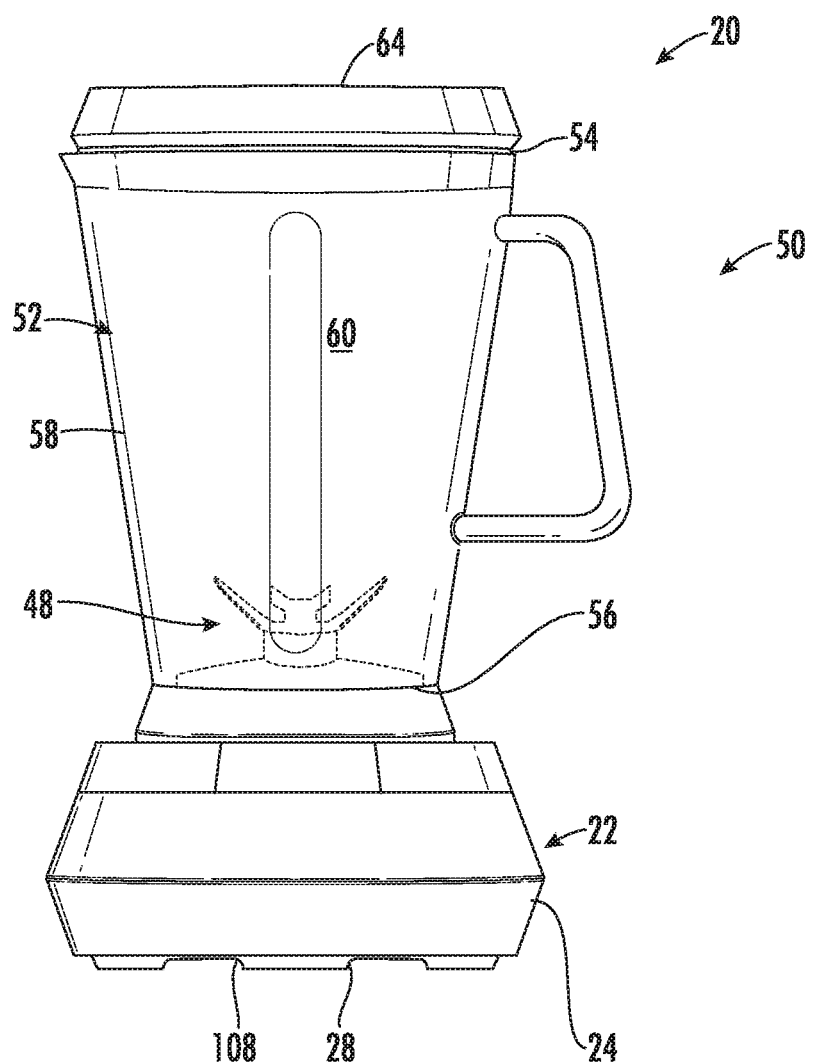
FIG. 5 is a perspective view of a food processing system including another attachment according to an embodiment.

Examples of another attachment 50 that may be suitable for use with the base 22 is illustrated in FIGS. 4 and 5. As shown, the attachment 50 similarly includes a container 52 having a first open end 54, a second closed end 56, and one or more sidewalls 58 extending between the first end 54 and the second end 56 to define a hollow processing chamber 60 of the container 34. In an embodiment, the container 52 is a "food processing bowl" and may be sized to hold approximately 40 fluid ounces (FIG. 4). Alternatively, the container 52 may be a "pitcher" having a capacity greater than the food processing bowl, such as approximately 72 fluid ounces for example (FIG. 5). However, embodiments, where the container 52 has a larger or smaller capacity are also within the scope of the disclosure.

A rotatable processing assembly 48 disposed within the processing chamber 60 may be integrally formed with the second end 56 of the container 52, or alternatively, may be removably coupled thereto. The rotatable processing assembly 48 may have a substantially similar configuration to the rotatable processing assembly 48 of the embodiment of FIG. 3, or alternatively, may have a different configuration. The attachment 50 may additionally include an accessory, such as a lid 64 configured to couple to the first open end 54 of the container 52 to seal the processing chamber 60. The second sealed end 56 of the attachment of FIGS. 4 and 5 is configured to mount to the base 22 to perform a food processing operation. Accordingly, the orientation of the container 52 when the attachment 50 is connected to the base 22 and when the attachment 50 is separated from the base 22 remains generally constant.

Figure 6A:
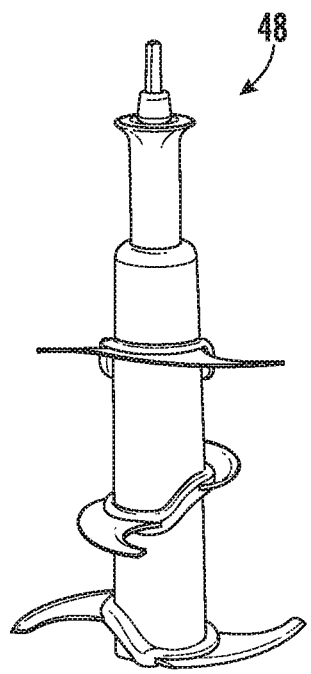
FIGS. 6A-6F are perspective views of various rotatable blade assemblies according to an embodiment.
Figure 6B:
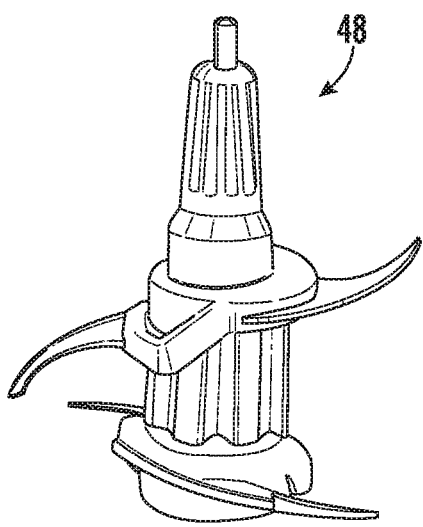
Figure 6C:
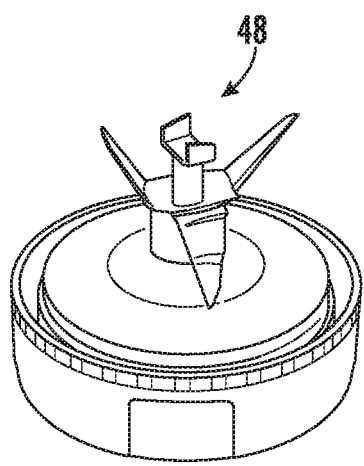
Figure 6D:
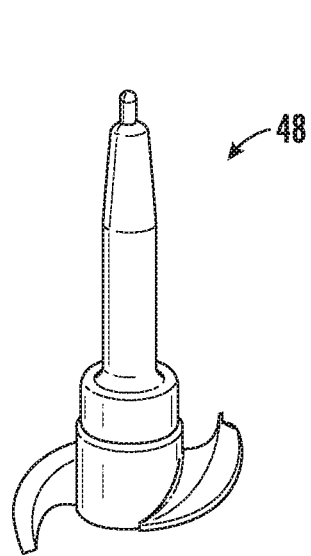
Figure 6E:
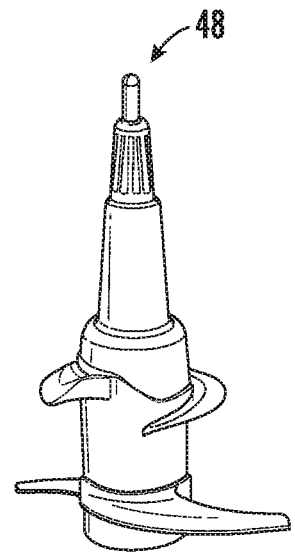
Figure 6F:
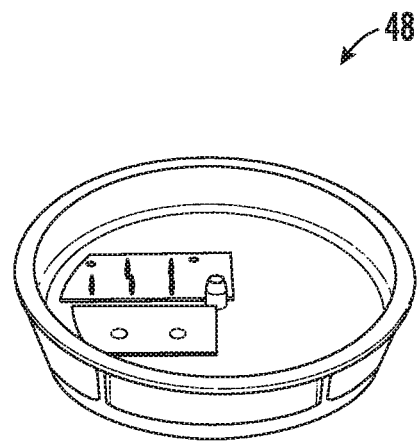

Examples of various rotatable processing assembly 48 suitable for use with one or more attachments of the food processing system 20 as illustrated in FIGS. 6A-6E. These include, a rotatable processing assembly including six blades (3 pairs) stacked along the axis of rotation (FIG. 6A), a rotatable processing assembly including four blades (2 pairs) stacked along the axis of rotation (FIG. 6B), a rotatable processing assembly including a pair of downwardly angled blades, a pair of upwardly angled blades, and a pair of vertically extending crushing blades (FIG. 6C). a rotatable processing assembly including two blades contoured specifically for preparation of dough (FIG. 6D), a rotatable processing assembly including four blades (2 pairs) stacked along an axis of rotation and contoured specifically for preparation of dough (FIG. 6E), and a disc including at least one blade for performing a slicing operation (FIG. 6F). It should be understood that the rotatable processing assemblies 48 illustrated herein are intended as an example only and that any suitable processing assembly is within the scope of the disclosure.

Figure 14:
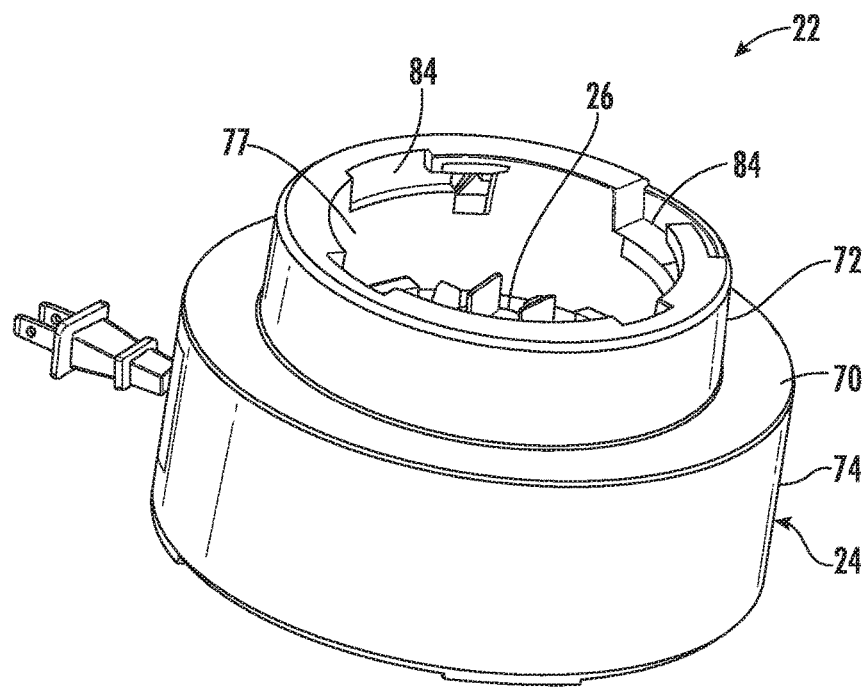
FIG. 14 is a perspective view of a base of the food processing system according to an embodiment.

With reference again to FIG. 2, in the illustrated, non-limiting embodiment, the base 22 includes a generally planar upper surface 70, and a coupling wall 72 extends upwardly from the upper surface 70. The coupling wall 72 may extend perpendicularly from the upper surface 70 (FIG. 14), or alternatively, may extend from the upper surface 70 at a non-perpendicular angle (FIG. 2). For example, as shown, the coupling wall 72 has a generally frustoconical configuration. In the illustrated, non-limiting embodiment, the coupling wall 72 is oriented generally parallel to a portion of the housing 24, such as a sidewall 74 for example, that extends downwardly at an angle from the outer periphery of the upper surface 70.

For each of the various attachments, the rotatable processing assembly 48 is configured to couple to the base 22 of the food processing system 20. A driven coupler 76 (see FIG. 7) associated with one or more blades of the rotatable processing assembly 48 is positioned at an external surface of rotatable processing assembly 48. Accordingly, when an attachment, such as attachment 32 or attachment 50 to the base 22, the driven coupler is receivable within the hollow interior 77 defined by the coupling wall 72. The at least one drive coupler 26 is configured to engage the driven coupler 76 to rotate the rotatable processing assembly 48 about an axis X to process the food products located within the processing chamber 42, 60 of the attachment 32, 50.

In some embodiments, such as when the rotatable processing assembly 48 is part of a processing accessory 44 configured for use with an inverted container 34 for example, the processing accessory 44 and/or the first end 36 of the container 34, is also receivable within the hollow interior of the coupling wall. Alternatively, the attachment 32, 50 may be positionable in overlapping arrangement with the coupling wall 72 (see FIGS. 4 and 5). In an embodiment, best shown in FIG. 7, the at least one sidewall 58 of the container 52 extends beyond the second end 56 of the container 52 to define a coupling chamber 78 there between. As shown, the driven coupler 76 of the rotatable processing assembly 48 is disposed within the coupling chamber 78. In such embodiments, when connecting the container 52 to the base 22, the coupling wall 72 is receivable within the coupling chamber 78 of the container 52. In an embodiment, the configuration of the extended portion 59 of the sidewall 58 at the coupling chamber 78, such as the angle and/or length for example, is complementary to the coupling wall 72 such that an outwardly facing surface 81 of the coupling wall 72 directly contacts an interior surface 83 of the extended portion 59 of the sidewall 58. It should be understood that any attachment suitable for use with the base 22, regardless of the configuration of the attachment, may be either receivable within the interior 77 of the coupling wall 72, or alternatively, in overlapping arrangement with the coupling wall 72.

In an embodiment, best shown in FIG. 3, an attachment, such as attachment 32 for example, may include one or more contact members 80. However, it should be understood that any attachment, such as attachment 50 for example, may include one or more contact members. As shown in the FIG., the contact members may be tabs or another protrusion positioned about the periphery the attachment 32. Although the embodiment of FIG. 3 includes four contact members 80, it should be understood that an attachment having any number of contact members 80 is within the scope of the disclosure. Further, although the contact members 80 are illustrated as being located at the body 46 of the processing accessory 44, it should be understood that embodiments where one or more contact members 80 alternatively or additionally extend from the container 34 are also within the scope of the disclosure.

The contact members 80 of the attachment 32 may be configured to cooperate with a mounting area of the base 22 to couple the attachment 32 to the base 22. In the illustrated, non-limiting embodiment, the coupling wall 72 may form the mounting area of the base 22. However, embodiments where the mounting area is arranged at another portion of the base, such as in the upper surface 70 of the base 22 or within the interior 77 for example, are also contemplated herein. The mounting area may include one or more receiving slots 84 within which each of the plurality of contact members 80 of the attachment 32 is receivable (see FIG. 14). The attachment 32 may be configured to slidably connect to the base 22 of the food processing system 20. Alternatively or in addition, the attachment 32 may be configured to rotatably connect to the base 22. For example, the attachment may be configured to rotate approximately 30 degrees between a configuration where the attachment 32, 50 is separable from the base 22 and a configuration where the attachment 32, 50 is locked relative to the base 22, such as during operation of the system for example. However, it should be understood that any suitable mechanism for coupling the attachment 32, 50 to the base 22 is within the scope of the disclosure.

In an embodiment, engagement between the contact members 80 and the corresponding receiving slots 84 defines an interlock operable to engage one or more microswitches to complete a circuit for delivering power to the motorized unit 106. Alternatively, or in addition, one or more sensors may define an interlock of the food processing system. In an embodiment, an attachment includes one or more magnets and the base includes one or more reed switches. In such embodiments, the motorized unit cannot operate unless each reed switch is engaged with a corresponding magnet. Use of a plurality of magnets and reed switches may allow the attachment to connected to the base in multiple orientations. Such an interlock system allows for easy engagement between the attachment and the base by a user, without requiring careful alignment of tabs or other contact members.

Figure 8:
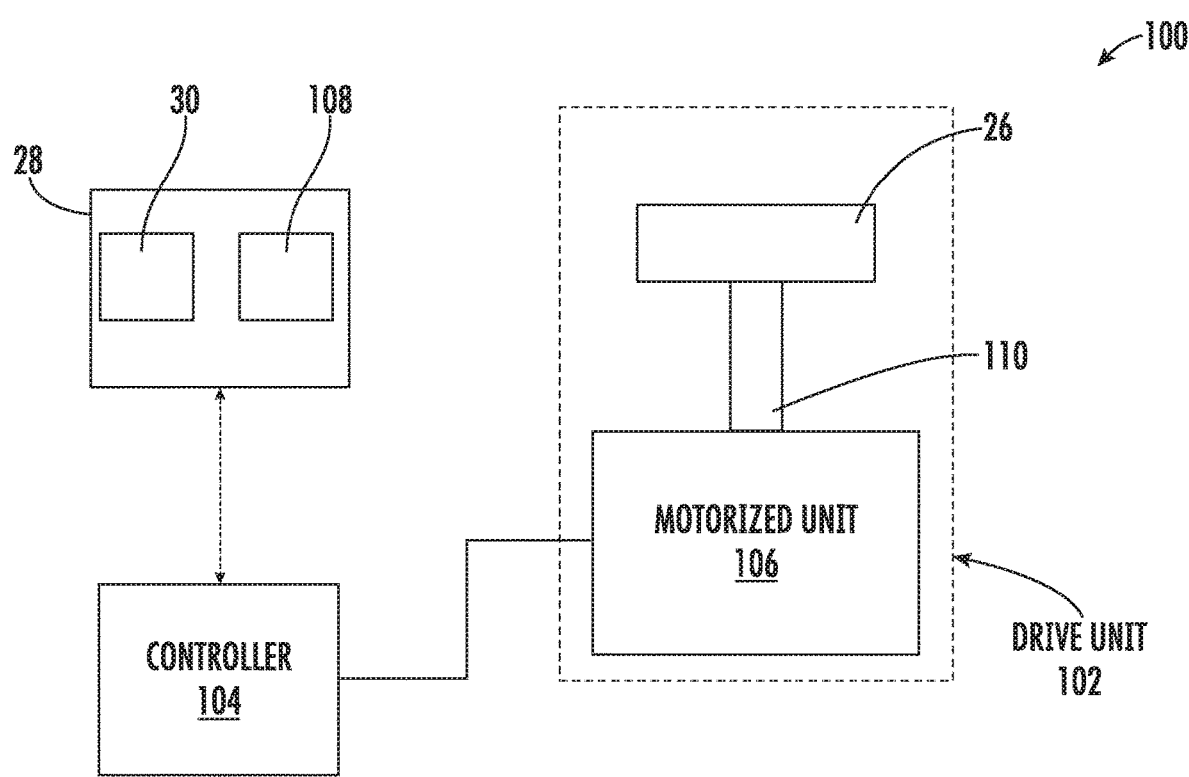
FIG. 8 is a schematic: diagram of a control system of the food processing system according to an embodiment.

With reference now to FIG. 8, an example of a control system 100 of the food processing system 20 is illustrated in more detail. As shown, the control system 100 includes the user interface 28, which is positioned adjacent one or more sides of the housing 24, or alternatively, on the upper surface 70 of the base 22. The user interface 28 includes one or more inputs 30 associated with energizing the motorized unit 106 and for selecting various modes of operation of the food processing system 20. One or more of the inputs 30 may include a light or other indicator to show that the respective input has been selected. The user interface 28 may additionally include a display 108, separate from and associated with the at least one input 30. However, embodiments where the display 108 is integrated into the at least one input 30 are also contemplated herein. As shown, the control system 100 of the food processing system 20 includes a controller or processor 104 operably coupled to the user interface 28 and to the drive unit 102. The controller 104 is configured to controlling operation of the motorized unit 106 and in some embodiments for executing stored sequences of operation of the rotatable processing assembly 48 in response to one or more inputs 30 provided to the user interface 28.

Figure 9:
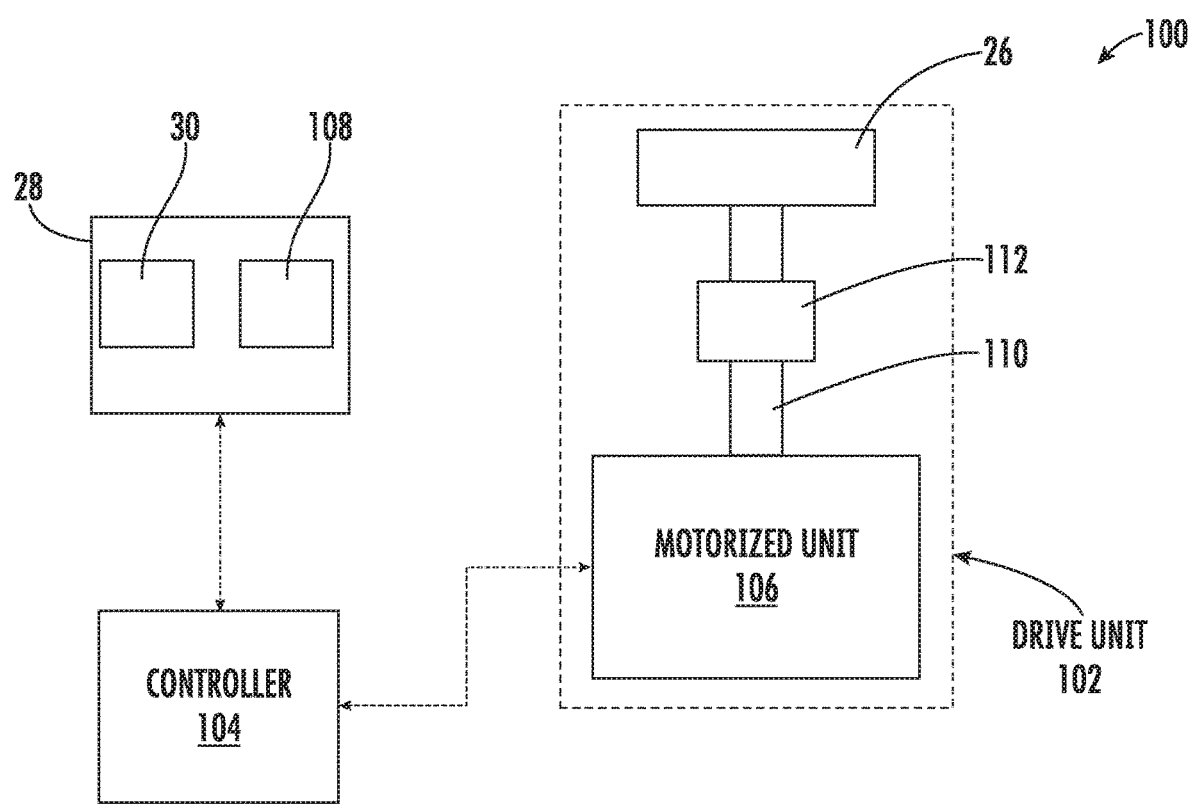
FIG. 9 is a schematic diagram a control system of the food processing system according to an embodiment.
Figure 10:
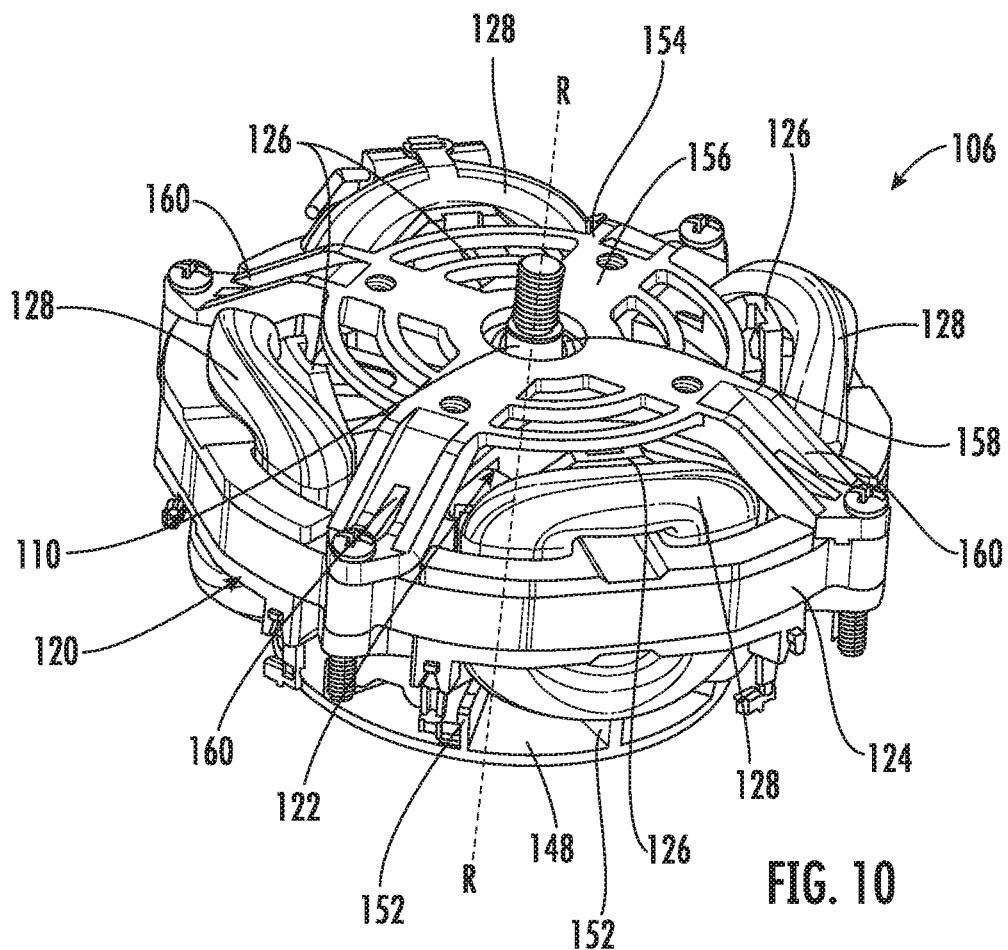
FIG. 10 is a perspective view of a motorized unit of a food processing system according to an embodiment.
Figure 11:
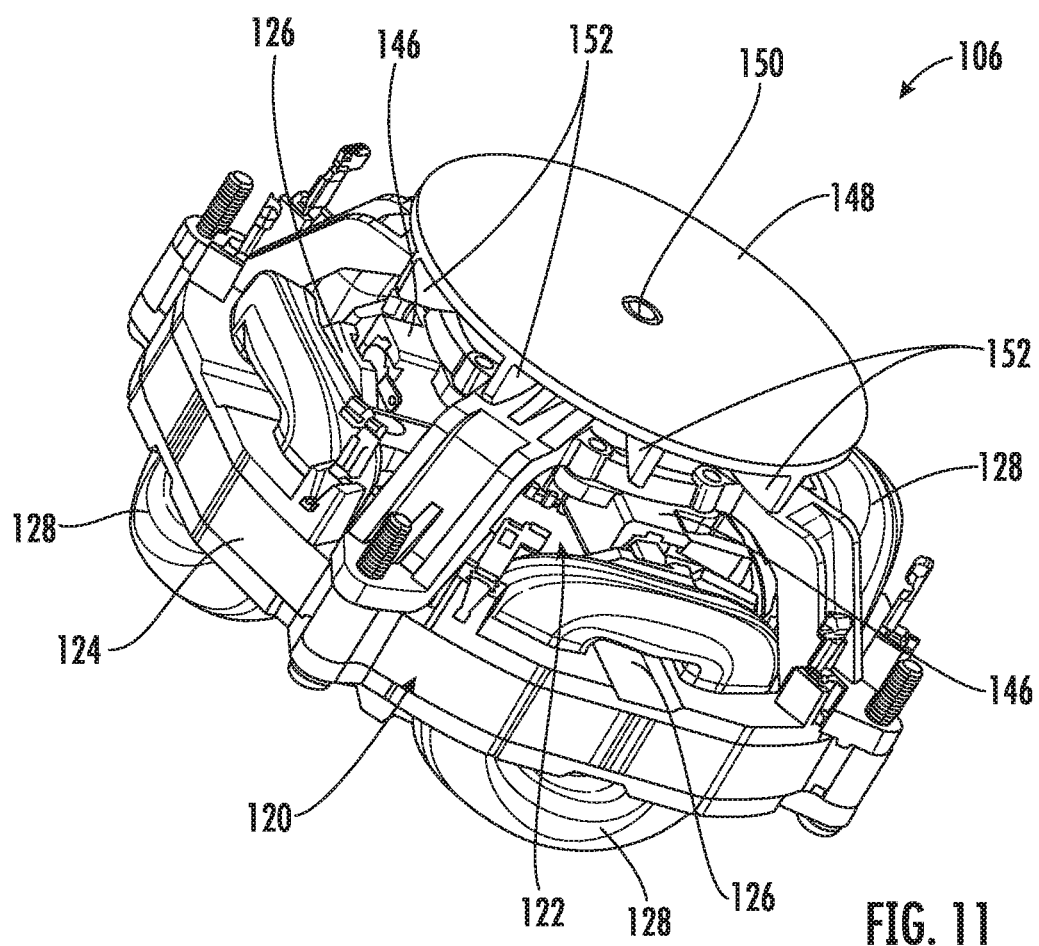
FIG. 11 is another perspective view of a motorized unit of a food processing system according to an embodiment.

As illustrated schematically in the FIG. 8, the drive unit 102 includes a centrally located drive shaft 110 rotatable about axis X in at least one direction, and in some embodiments, in both a first direction and a second, opposite direction. The drive coupler 26 is affixed to a portion of the drive shaft 110, such as an end thereof for example. Rotation of the drive shaft 110 is controlled by the motorized unit, illustrated schematically at 106. The motorized unit 106 may be directly coupled to the drive coupler, such that the drive coupler is rotated at the same speed as the drive shaft 110, as shown in FIG. 8. Alternatively, the motorized unit 106 may be indirectly connected to the drive coupler 26, such as via a gearbox or transmission 112 for example (see FIG. 9), such that a rotational speed of the drive shaft 110 may, but need not be different, for example greater than or less than the rotational speed of the drive coupler 26. In such embodiments, the axis of the drive shaft 110, may be coaxial with the axis of the drive coupler 26. However, embodiments where the axis of the drive shaft 110 is offset from the axis of the drive coupler 26, in either a parallel or angled configuration, are also contemplated herein.

With reference now to FIGS. 10-13, an example of the motorized unit 106 of the food processing system 20 is illustrated in more detail. As shown, the motorized unit 106 includes an electric motor having a stator assembly 120 rigidly mounted within the base 22, and a rotor assembly 122 configured to rotate about an axis of rotation. The stator assembly 120 includes at least one, and in some embodiments, a plurality of stacked stator laminations 124. In embodiments including a plurality of stator laminations 124, the stator laminations 124 may be glued, bonded, or welded together. The one or more stator laminations 124 have a diameter, measured between opposite sides of an outer periphery of the stator laminations 124 within a plane arranged generally perpendicular to the axis of rotation R of the rotor assembly 122. In an embodiment, the diameter of the stator laminations 124 is greater than 90 mm, such as equal to or greater than about 100 mm, 105 mm, 110 mm, 115 mm, or 120 mm. The stator laminations 124 additionally have a height measured parallel to the axis of rotation R of the rotor assembly 122. In an embodiment, the stator laminations 124 have a height less than or equal to about 20 mm, and in some embodiments, less than or equal to about 18 mm, 15 mm, 14 mm, 13 mm, 12 mm, 11 mm, or 10 mm. Accordingly, a stator lamination having any combination of a height less than or equal to about 20 mm and a diameter greater than or equal to about 100 mm is within the scope do the disclosure. Further, in an embodiment, a ratio of the diameter to the height of the stator laminations 124 is greater than 3:1. For example, the ratio of the diameter to the height of the stator laminations 124 may be equal to or greater than 3.5:1, 4:1, 5:1, 6:1, 7:1, 8:1, 9:1 10:1, 11:1 12:1, 15:1, or 20:1. In an embodiment, the ratio of the diameter to the height of the stator laminations 124 may be anywhere between 3:1 and 250:1.

In addition, each stator lamination 124 includes a plurality of inwardly extending stator arms 126. Although only four stator arms 126 are illustrated in the non-liming embodiment, it should be understood that a stator assembly 120 having any number of inwardly extending stator arms is within the scope of the disclosure. A wire, such as formed from a copper or aluminum material for example, may be wound around the stator arms 126 of the one or more stator laminations 124 to form coils 128 that generate a magnetic field configured to interact with the rotor assembly 122. Various configurations of the stator coils 128 are known. Although the plurality of stator coils 128 are illustrated as being generally separate from one another, a person having skill in the art would understand that the stator coils 128 may be integrally formed such as via a continuous wire for example.

As shown, each stator arm 126 and a corresponding stator coil 128 wrapped about the stator arm 126, in combination, define one a pole of the stator assembly 120. Although each stator coil 128 is illustrated as being wound about a single stator arm 126, respectively, it should be understood that in other embodiments, the stator coils 128 may be wound about a plurality of stator arms 126. In the illustrated, non-limiting embodiment, the stator assembly 120 includes four poles. Accordingly, the wire may be wrapped about the stator arms 126 of the at least one stator lamination 124 to define four distinct poles where adjacent poles have an opposite polarity. As shown, the poles may, but need not have substantially identical configurations and/or be equidistantly spaced about the stator. However, it should be understood that embodiments where the stator assembly 120 has any number of poles are also contemplated herein. For example, the stator assembly 120 may be configured with any of three poles, four poles, five poles, six poles, seven poles, or eight poles.

Figure 12:
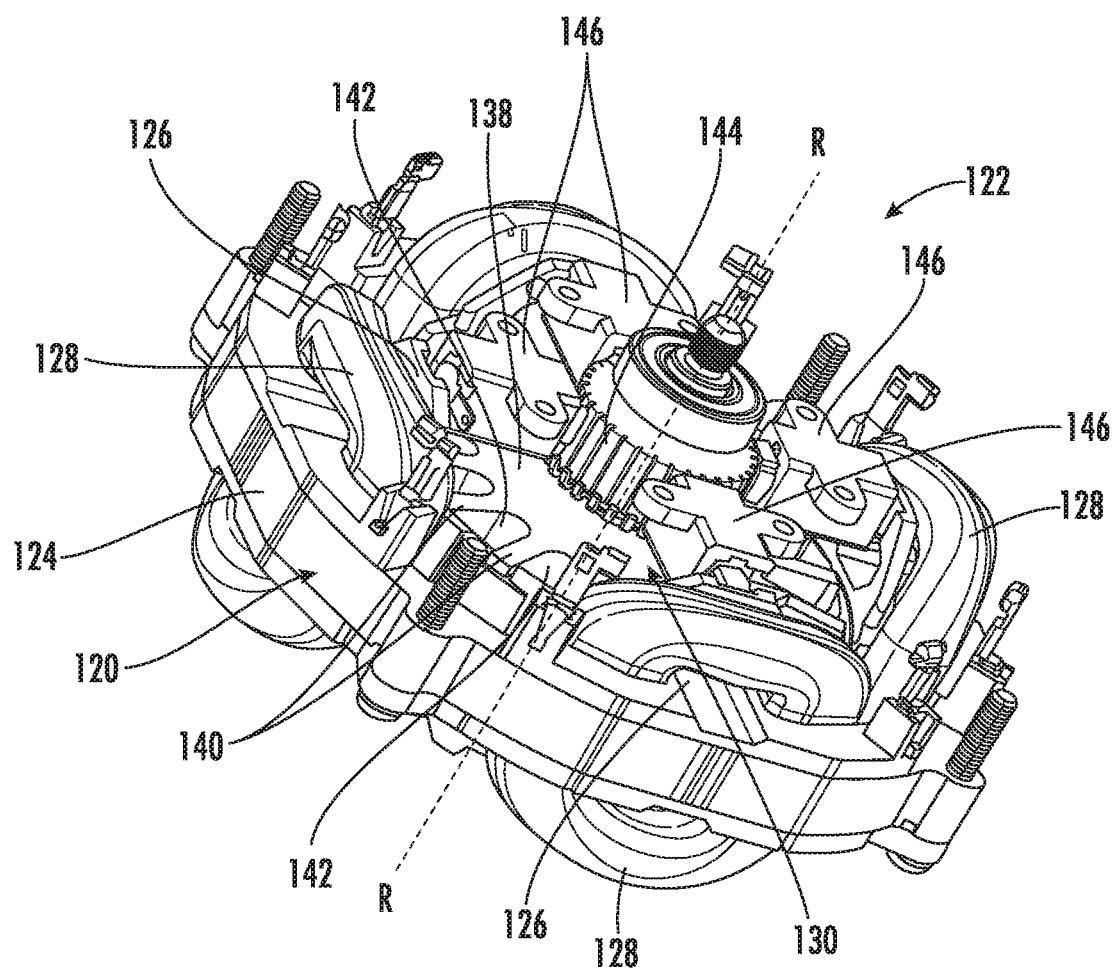
FIG. 12 is a perspective view of a motorized unit of a food processing system with the fan and mounting bracket removed according to an embodiment.
Figure 13:
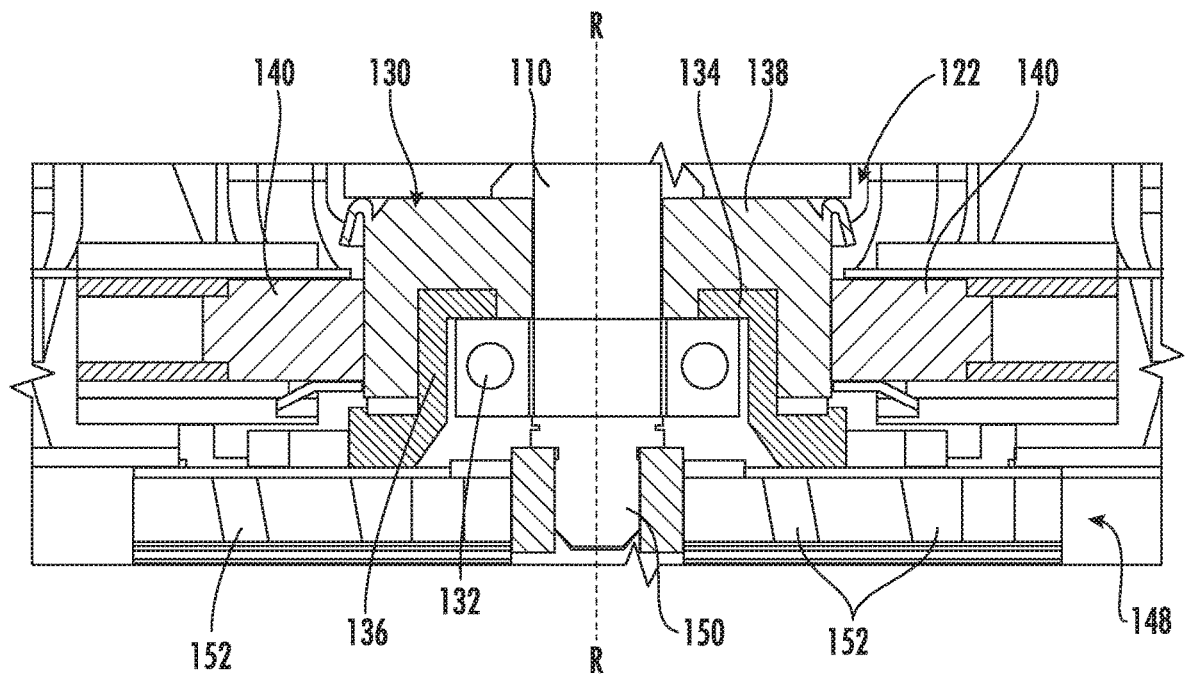
FIG. 13 is a cross-sectional view of a portion of a motorized unit of a food processing system according to an embodiment.

The rotor assembly 122, best shown in FIG. 12, includes a main armature 130 rotationally fixed to the central drive shaft 110. The drive shaft 110 is supported by one or more bearings 132 carried by a casing or housing of the motorized unit 106. The bearings 132 are typically mounted adjacent the ends of the drive shaft 110, in a stacked configuration with the main armature 130 relative to the axis R of the drive shaft 110. However, as best shown in FIG. 13, in an embodiment, a bearing 132 may be mounted concentrically with a portion of the main armature 130. As shown, the main armature 130 may be designed with a hollowed region 134 within which a portion of the motor housing 136 and the bearing 132 may be mounted. By mounting the bearing 132 in overlapping arrangement, and specifically concentrically within the main armature 130, the overall height of the rotor assembly 122 may be reduced.

Further, in the illustrated, non-limiting embodiment (best shown in FIG. 12), the main armature 130 includes an armature core 138 having a plurality of teeth 140 extending radially outwardly such that slots 142 are formed between adjacent teeth 140 and extend parallel to the axis of rotation R. The plurality of teeth 140 may be equidistantly positioned about the periphery of the armature core 138. The motorized unit 106 may be a wound field motor such that the main armature 130 additionally includes a plurality of windings (not shown) wound about the teeth 140 of the main armature 130. An end of the windings is configured to terminate at a commutator 144 affixed to a portion of the drive shaft 110. As is known in the art, the windings or coils 128 of the stator assembly 120 and the windings of the rotor assembly 122 may be connected to form a series wound motor (stator windings and the rotor windings arranged in series), a shunt wound motor (stator windings and the rotor windings are arranged in parallel), or a compound wound motor. One or more brushes 146 are arranged in contact with a surface of the commutator 144. The brushes 146 are configured to connect the rotor windings to a source of electrical power via the commutator 144. Although the illustrated, non-limiting embodiment includes four brushes 146, it should be understood that a motorized unit 106 having any suitable number of brushes 146 is within the scope of the disclosure. The power required to operate the motorized unit 106 may be between about 600 W and 2 kW.

Further, although the motorized unit 106 is illustrated and described herein as a brushed direct current motor, it should be understood that other types of motors are also within the scope of the disclosure. For example, embodiments where either the stator assembly 120 or the rotor assembly 122 includes a plurality of permanent magnets in place of the wound coils are also contemplated herein. In such embodiments, the motorized unit 106 may not require the commutator 144 and brushes 146 disclosed herein. In an embodiment, the drive shaft 110 of the motorized unit 106 may be rotatable at a speed between about 5000 rpm and 25000 rpm when a load is not applied to the motorized unit 106, and the drive shaft 110 may be rotatable at a speed between about 5000 rpm and 13000 rpm when a load is applied to the motorized unit 106, such as the processing assembly 48 for example.

With continued reference to FIGS. 10-13, the motorized unit 106 may additionally include a fan or impeller 148 operable to move air through the housing 24 to cool the motorized unit 106. The fan 148 may be an axial flow fan, a radial flow fan, or a fan having another suitable configuration. In the illustrated, non-limiting embodiment, the fan 148 is operably coupled to the drive shaft 110. As shown, the fan 148 may be connected to an end 150 of the drive shaft 110, such that rotation of the drive shaft 110 driven by the rotor assembly 122 causes a similar rotation of the fan 148 about the axis of rotation R. The fan 148 may include a plurality of vanes 152 configured to direct air flowing across the stator and rotor assemblies 120, 122 radially outwardly. Further, at least one mounting bracket 154 may be used to mount the motorized unit 106 within the base 22. As illustrated, the mounting bracket 154 may a central portion 156 having an opening 158 through which the drive shaft 110 extends and a include a plurality of arms 160 extending outwardly from the central portion 156 configured to connect to the stator assembly 120, such as at a position between adjacent stator coils 128 for example. However, a mounting bracket 154 having any suitable configuration is within the scope of the disclosure. Further, although the mounting bracket 154 is illustrated as being disposed adjacent an opposite side of the stator assembly 120 as the fan 148, embodiments where the mounting bracket 154 and the fan 148 are located at the same side of the stator assembly 120 are also within the scope of the disclosure.

It should be understood that embodiments where the fan 148 is located remotely from the drive shaft 110 are also within the scope of the disclosure. In such embodiments the fan 148 is driven independently from the drive shaft 110 of the motor. By positioning the fan 148 at a lateral side of the motor within the base 22, the overall height of food processing base 22 may be reduced. Further, because the fan 148 is not driven by the drive shaft 110, the fan is able to generate an air flow for cooling the motor even when the drive shaft 110 is operating at a low rotational speed, such as less than about 1300 rpm for example, during chopping or dough applications.

Existing food processing appliances typically use a motorized unit having a two pole configuration (the two poles referring to the total number of poles of the stator assembly 120). By using a motorized unit 106 having a four pole configuration, the motorized unit 106 can generate more torque than a motor having two pole configuration, when operated at the same speed. Accordingly, the motorized unit 106 having a four pole configuration can be operated at a slower speed than an existing two pole motor to generate the same torque output.

The rotational speed of the motor during a food processing operation may be configured to vary based one or more parameters of the food processing system 20. Such parameters include, but are not limited to, the food processing operation being performed, the attachment 32, 50 affixed to the base 22, and the rotatable processing assembly 48 being driven by the motorized unit 106. For example, when the attachment connected to the base is one of a personal blending container and a pitcher, and the rotatable processing assembly 48 is a high speed bottom blade, as shown in FIGS. 1-5 and 6C, the maximum rotational speed of the processing tool driven directly by the motorized unit 106 may be approximately 20,000 rpm, and the minimum rotational speed of the processing tool may be about 5,000 rpm. In an embodiment, the actual rotational speed of the processing tool will be between about 10,000 rpm and about 14,000 rpm. The maximum rotational speed, minimum rotational speed, and actual rotational speeds of each of the processing tools described herein represent speeds when the attachment is filled, also known as "under water load."

| Attachment | Processing Tool | Transmission | Max RPM Under Water Load | Min RPM Under Water Load | Actual RPM Under Water Load |
|---|---|---|---|---|---|
| Personal Blending Container (FIG. 3) | High Speed Bottom Blade | N | About 20,000 | About 5,000 | About 10,000-14,000 |
| Pitcher (FIG. 5) | High Speed Bottom Blade | N | About 20,000 | About 5,000 | 10,000-14,000 |

Similarly, when the attachment connected to the base is a jar and the rotatable processing assembly 48 has a stacked 6-blade configuration (FIG. 6A) or a stacked 4-blade configuration (FIG. 6B), the maximum rotational speed of the processing tool driven directly by the motorized unit 106 may be approximately 10,000 rpm, and the minimum rotational speed of the processing tool may be about 2,000 rpm. In an embodiment, the actual rotational speed of the stacked 6-blade processing assembly or the stacked 4-blade processing assembly will be between about 5,000 rpm and about 7,000 rpm. Additionally, when the attachment connected to the base is a pitcher, the maximum rotational speed of the stacked 6-blade processing tool, whether driven directly by the motorized unit 106 or indirectly via a transmission, may be approximately 3,000 rpm, and the minimum rotational speed of the processing assembly may be about 1,000 rpm. In an embodiment, the actual rotational speed of the stacked 6-blade processing assembly will be about 1,500 rpm. For configurations including a pitcher and the stacked 4-blade processing tool, the maximum rotational speed of the processing tool may be approximately 4,000 rpm, and the minimum rotational speed of the processing tool may be about 1,000 rpm. In an embodiment, the actual operational speed of the 4-blade stacked processing tool is between about 1,500 and 3,000 rpm.

| Attachment | Processing Tool | Transmission | Max RPM Under Water Load | Min RPM Under Water Load | Actual RPM Under Water Load |
|---|---|---|---|---|---|
| Pitcher | Stacked 6 blade (FIG. 6A) | N | About 10,000 | About 2,000 | 5,000-7,000 |
| Food Processing Bowl (FIG. 4) | Stacked 6 blade (FIG. 6A) | N | About 3,000 | About 1,000 | 1,500 |
| Food Processing Bowl (FIG. 4) | Stacked 6 blade (FIG. 6A) | Y (Gear Reduction between 20:1 and 3:1) | About 3,000 | About 1,000 | 1,500 |

| Attachment | Processing Tool | Transmission | Max RPM Under Water Load | Min RPM Under Water Load | Actual RPM Under Water Load |
|---|---|---|---|---|---|
| Pitcher | Stacked 4 blade (FIG. 6B) | N | About 10,000 | About 2,000 | About 5,000-7,000 |
| Food Processing Bowl | Stacked 4 blade (FIG. 6B) | N | About 4,000 | About 1,000 | About 1,500-3,000 |
| Food Processing Bowl | Stacked 4 blade (FIG. 6B) | Y (Gear Reduction between 20:1 and 3:1) | About 4,000 | About 1,000 | About 1,500-3,000 |

In embodiments where the attachment connected to the base 22 is a food processing bowl and the processing assembly 48 is one of a 2-blade dough tool, a 4-blade dough tool, and a slicing disc, the maximum rotational speed of the processing assembly 48, whether driven directly or indirectly by the motorized unit 106, may be approximately 4,000 rpm, and the minimum rotational speed of the processing assembly 48 may be about 1,000 rpm. In an embodiment, the actual rotational speed of the processing assembly 48 when the container will be between about 1,500 rpm and about 3,000 rpm.

| Attachment | Processing Tool | Transmission | Max RPM Under Water Load | Min RPM Under Water Load | Actual RPM Under Water Load |
|---|---|---|---|---|---|
| Food Processor Bowl | Dough 2 blade (FIG. 6D) or Dough 4 blade (FIG. 6E) or Slicing Disc (FIG. 6F) | N | About 4,000 | About 1,000 | 1,500-3,000 |
| Food Processor Bowl | Stacked 4 blade (FIG. 6D) or Dough 4 blade (FIG. 6E) or Slicing Disc (FIG. 6F) | Y (Gear Reduction between 20:1 and 3:1) | About 4,000 | About 1,000 | 1,500-3,000 |

By using a motorized unit as described herein within a food processing device, the overall height of the food processing device may be substantially reduced, thereby reducing the total amount of space, such as above a countertop for example, occupied by the food processing system. In an embodiment, the overall height of the base 22 is defined as the vertical distance between the upper surface 70 of the base and a bottom surface of the base 22 in contact with a support surface such as the countertop. However, in other embodiments, the overall height may be the distance extending between an upper end of the coupling wall 72 and the bottom surface of the base 22 in contact with a support surface such as the countertop. The overall height of the base 22 of the food processing system 20 may be less than or equal to about 5 inches, less than or equal to 4.5 inches, such as between 4 inches and 4.5 inches for example, less than or equal to about 4 inches, less than or equal to 3.5 inches, such as between 3 inches and 3.5 inches for example, less than or equal to about 3 inches, and in some embodiments, less than or equal to about 2 inches. In an embodiment, the overall height of the base 22 is about 4.2 inches, and in another embodiment, the overall height of the base 22 is about 3.3 inches. Further, by using a motor having more than two poles, the torque generated by the motor is equal to or even greater than the torque of existing food processing systems having a two-pole motor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A food processing base of a food processing system comprising:
    a housing having a mounting area for receiving an attachment including a processing assembly; and
    a motorized unit arranged within said housing, said motorized unit being operable to rotate said food processing assembly about an axis of rotation, wherein said motorized unit includes a diameter to height ratio that is greater than 3:1 and includes a stator assembly having at least one stator lamination,
    wherein said at least one stator lamination includes a plurality of stator arms, and said stator assembly includes at least four stator poles, each of said at least four stator poles including a stator coil wound about at least one stator arm of said plurality of stator arms.

2. The food processing base of claim 1, wherein said diameter to height ratio is equal to or greater than 10:1.

3. The food processing base of claim 1, wherein said diameter to height ratio is a ratio of a diameter of said at least one stator lamination to a height of said at least one stator lamination.

4. The food processing base of claim 1, further comprising a drive coupler operable to engage said food processing assembly when said attachment is connected to said housing.

5. The food processing base of claim 4, further comprising a transmission operably coupled to a drive shaft of said motorized unit and said drive coupler, wherein a gear reduction ratio of said transmission is greater than 3:1.

6. The food processing base of claim 5, wherein a gear reduction ratio of said transmission is up to 20:1.

7. The food processing base of claim 1, wherein a height of said food processing base is less than 5 inches.

8. The food processing base of claim 1, wherein said motorized unit is rotatable at a speed between 5000 rpm and about 25000 rpm when no load is applied to said motorized unit.

9. The food processing base of claim 1, wherein said motorized unit is rotatable at a speed between 5000 rpm and about 13000 rpm when a load is applied to said motorized unit.

10. A food processing base of a food processing system comprising:
    a housing having a mounting area for receiving an attachment including a food processing assembly; and
    a motorized unit arranged within said housing, said motorized unit being operable to rotate said food processing assembly about an axis of rotation, wherein said motorized unit includes a stator assembly having at least one stator lamination,
    wherein said at least one stator lamination includes a plurality of stator arms, and said stator assembly includes a plurality of stator poles, said plurality of stator poles including at least four stator poles, each of said at least four stator poles including a stator coil wound about at least one stator arm of said plurality of stator arms.

11. The food processing base of claim 10, further comprising a drive coupler operable to engage said food processing assembly when said attachment is connected to said housing.

12. The food processing base of claim 11, further comprising a transmission operably coupled to a drive shaft of said motorized unit and to said drive coupler, and a gear reduction ratio of said transmission is greater than 3:1.

13. A food processing base of a food processing system comprising:
    a housing having a mounting area for receiving an attachment including a food processing assembly; and
    a motorized unit arranged within said housing, said motorized unit being operable to rotate said food processing assembly about an axis of rotation, wherein said motorized unit includes a rotor assembly including:
    a drive shaft rotatable about an axis;
    an armature affixed to said drive shaft; and
    a bearing coupled to said drive shaft, said bearing being mounted in overlapping arrangement with said armature relative to said drive shaft, and
    wherein the motorized unit also includes a stator assembly having at least one stator lamination,
    wherein said at least one stator lamination includes a plurality of stator arms, and said stator assembly includes at least four stator poles, each of said at least four stator poles including a stator coil wound about at least one stator arm of said plurality of stator arms.

14. The food processing base of claim 13, wherein said bearing is mounted concentrically with said armature relative to said drive shaft.

15. The food processing base of claim 13, wherein said armature includes a hollowed region and said bearing is arranged within said hollowed region.

16. The food processing base of claim 13, wherein said motorized unit has a ratio of a diameter of said at least one stator lamination to a height of said at least one stator lamination is greater than 3:1.

* * * * *